April 15, 1969     C. D. GROVER     3,438,240
METHOD AND APPARATUS FOR DETERMINING CAMERA SHUTTER SPEED
Original Filed Oct. 2, 1964
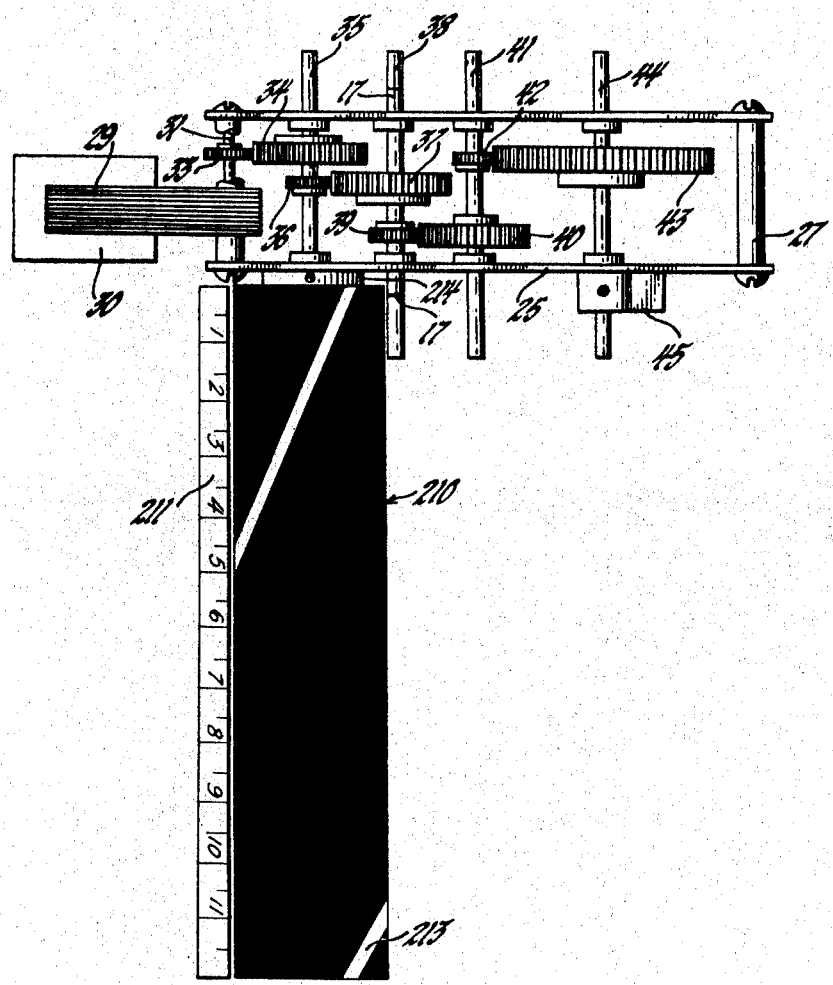

United States Patent Office 3,438,240
Patented Apr. 15, 1969

3,438,240
METHOD AND APPARATUS FOR DETERMINING CAMERA SHUTTER SPEED
Clayton D. Grover, deceased, late of Orange, N.J., by Laury Farrand Grover, executrix, 392 Lawn Ridge Road, Orange, N.J. 07050
Original application Oct. 2, 1964, Ser. No. 401,180, now Patent No. 3,335,600, dated Aug. 15, 1967. Divided and this application Mar. 9, 1967, Ser. No. 633,328
Int. Cl. G03b 43/02
U.S. Cl. 73—5        3 Claims

ABSTRACT OF THE DISCLOSURE

A method and apparatus for measuring the time that a camera shutter remains open. A cylinder having a black surface provided with a white indicator stripe arranged as a single convolution is rotated at a predetermined r.p.m. alongside a fixed ruler scale parallel to the cylinder axis. The associated scale and rotating cylinder are photographed to obtain a picture in which the white stripe appears as an axially extending blur, the extent of which is determined by reference to the scale indicia. By employing a prescribed equation involving the linear length of the cylinder, its r.p.m., the linear length of the stripe blur, and the width of the stripe, the shutter speed of the photographing camera is ascertained.

Cross-reference

This application is a division of the copending application of Clayton D. Grover, deceased, Ser. No. 401,180 filed Oct. 2, 1964, now Patent No. 3,335,600 titled Method and Apparatus for Determining Camera Shutter Speed.

Description

This invention relates to the art of measuring and testing devices, and particularly to measurement of camera shutter speed.

Professional photographers, particularly those of the press operating in the field, and amateur camera enthusiasts often experience a need to know the current operating shutter speed of their cameras. Shutter operation is susceptible to variation from rated speed under the influence of local atmospheric and temperature conditions and length of service. Adequate apparatus for testing is rarely available when need arises. Such apparatus in general is complex, cumbersome, and expensive. Moreover, it is difficult to transport and is not usually portable.

The present invention is a simple, inexpensive apparatus that is easily portable as a kit of light weight and few parts capable of quick assembly to indicate photographically the current operating shutter speed of a camera with which it may be used.

The invention is also a novel method for determining the current operating shutter speed of a camera as distinguished from its rated speed.

Additionally, the invention comprises novel means for registering and photographically recording the movement of an indicator relative to a fixed scale during the exposure interval of a camera shutter, whereby the current operating speed of the shutter over that interval may be ascertained by simple calculation based on examination of the photographic record.

Other and incidental objects will be apparent from the following description taken in connection with the accompanying drawings, in which:

The single figure is a plan view of a preferred embodiment of the invention comprising the subject of this application.

The power unit 12 herein disclosed comprises an open frame having a front wall plate 25 and a parallel rear wall 26 connected by spacers 27 at the four corners thereof and to which the walls are secured by attaching elements 28. A simple shaded pole electric motor 29 operative by house current or batteries is mounted on the upper and lower spacers between the walls at one end of the frame, with the bulk of the motor and its field coil 30 projecting longitudinally outward beyond the frame end. The motor is not a constant speed motor, but is of the type commonly used for turntables, rotisseries, and the like. The shaft 31 of the motor armature 32 is journaled at its ends in the frame walls intermediate and in alignment with the adjacent pair of spacers 27.

Fixed to the armature shaft for rotation therewith is a driving pinion 33 meshed with a driven gear wheel 34 fixedly attached to a spindle shaft 35 spaced inwardly from the armature shaft 31 and parallel thereto in the transverse longitudinal median plane of the frame. The spindle shaft is journaled for rotation in the frame walls, and the ends of the shaft pass through the walls and extend appreciably outwardly thereof.

The spindle shaft 35 has fixed thereon a pinion 36 meshed with a gear wheel 37 fixedly attached on a second spindle shaft 38. A pinion 39 fixedly attached on the shaft 38 is meshed with a gear wheel 40 that is fixedly attached on a third spindle shaft 41. This spindle has fixedly attached thereon a pinion 42 meshed with a gear wheel 43 fixedly attached on a fourth spindle shaft 44.

All the spindle shafts and the motor armature shaft lie in a common plane, but may be otherwise arranged as desired. Also, the location of the motor and its manner of attachment in the frame may be other than as shown. The gear wheel 43 is of greater diameter than any of the others and is farthest removed from the motor 29 by which it and its spindle 44 are driven through the train comprising the pinions and gears of the intermediate spindles 35, 38 and 41. Gear wheel 43 is a monitor by which the r.p.m. of any selected one of the spindles or of the motor armature may be ascertained without recourse to instruments. Its ratio to the driving pinion 33 of the motor is such that, within the r.p.m. range of the motor, its spindle 44 will never rotate at an r.p.m. that cannot easily be counted by timing with an ordinary watch. In order to enable such timing the monitor spindle 44 carries an indicator arm or pointer 45 fixedly attached on its front projecting end for cycling revolution past a fixed mark of reference 46 on the outer face of the front wall 25. Thus, simply by counting the number of times per minute the pointer 45 passes the reference mark 46, the current operating r.p.m. of the monitor spindle 44 will be ascertained.

Each intermediate spindle rotates at an r.p.m. different from the individual r.p.m. of each of the other spindles, much greater than the monitor spindle 44 and reduced relative to the armature shaft 31 and its driving pinion 33. Each intermediate spindle operating gear wheel has a predetermined ratio to the monitor spindle gear wheel 43, which ratio is different from the ratio of any other spindle gear wheel, is known, and constitutes a factor used in calculating the current r.p.m. of the motor or of any one of the spindles selected to operate the indicator 13.

The photographic background member 210 consists of a rotatable cylinder having a black surface provided with a white indicator stripe 213 spirally arranged as a single convolution over the full axial length of the cylinder. The scale used in this form of register is a rectilinear ruler 211, scaled in inches or meters and fractions thereof, that is disposed by any suitable means (not shown) in stationary, fixed position alongside the background cylinder parallel thereto. A hub 214 on one end of the cylinder is adapted for fixed attachment to the end portion of a selected one of the power unit spindles for rotation therewith; this being shown in the figure, the spindle 35 adjacent the motor.

This form of register is best suited for use with focal plane shutter cameras as it avoids side edge distortion of the blur produced by the stripe 113 on the picture developed from a film exposed in a camera (not shown) disposed above the scale and cylinder with its shutter lens directed downwardly perpendicular thereto. The axial length of the photographically recorded blur between its side edges measured on the scale 211 shows visually the rectilinear distance the indicator stripe 213 appeared to have moved axially along the cylinder in the length of time the camera film was exposed by operation of the shutter. For purposes of explanation, the apparent "movement" of the indicator stripe due to optical illusion is treated herein as though it were physical movement.

From the above description it will be apparent that the r.p.m. of whichever of the power unit spindles is selected for use is translated into inches or meters by the register illustrated. As the motor 29 is not a constant speed motor, and because operation of the power unit varies under the influence of current local conditions of atmosphere and temprature, it is desirable that the spindle selected be one that operates at an r.p.m. best suited for optimum register performance with reference to the rated set speed of a camera shutter to be tested. The speed of the moving indicator should be faster than the rated shutter speed as set, but not excessively so. This desideratum requires that the current operating r.p.m. of the selected spindle be known prior to the step of recording on the camera film the extent to which the indicator moved with reference to its associated scale during the time the film was exposed by operation of the camera shutter.

Consequently, the first step in using the apparatus is ascertainment of the current r.p.m. of the power unit spindles. This is accomplished easily and before mounting the background simply by placing the power unit in operation and counting with the aid of an ordinary watch the number of times per minute that the pointer 45 cycles past the stationary, fixed reference mark 46 on the front face plate of the power unit. The counted cycles per minute is the actual r.p.m. of the monitor gear wheel 43. This, multiplied by the factor of the known ratio between the gear wheel of a selected spindle and the monitor gear wheel 43 gives the actual current operating r.p.m. of the selected spindle.

For example, let it be assumed that the ratio of the monitor gear wheel 43 to spindle gear wheel 34 is such that one full revolution of the gear 43 and its spindle 44, which registers as one cycle of the pointer 45 past the mark 46, represents sixty revolutions of gear wheel 34. The ratio factor is sixty. Thus, if the cycle count of the pointer is sixty per minute, it will be known that the gear wheel 34 and its spindle 35 then are operating at 3600 r.p.m.

This same formula applies in like manner to ascertainment of the current operating r.p.m. of each of the other spindles 38 and 41. The ratio of each of their respective gear wheels to the monitor gear wheel 43 is known, so that the r.p.m. of any intermediate spindle may be ascertained by multiplying the counted cycles per minute of pointer 45 by the ratio factor of the gear wheel of that particular spindle.

The shutter speed is calculated by the following equation:

$$\frac{1}{(L \times R) \div (D - W)} = S$$

where L is the linear length of a single convolution of a stripe on the cylinder; R is the spindle speed in r.p.s.; D is the linear length of the stripe blur measured parallel to the axis of rotation of the cylinder; W is the width of the strip measured parallel to the axis of rotation of the cylinder; and S is the shutter speed in fractions of a second.

In its broad aspects the present invention is a means for recording photographically the extent of relative movement at a predetermined rate of speed between an indicator and an associated scale during an interval of time prescribed by the recording means.

What is claimed is:

1. A camera shutter speed register comprising a cylinder having a photographic background surface with a photographically contrasting spiral indicator stripe thereon, a rectilinear scale in stationary fixed relation alongside and parallel to the cylinder, and means for rotating said cylinder at a predetermined rate of speed.

2. In combination with the register of claim 1, means operative to record photographically the extent of apparent linear movement of the indicator stripe along the scale during a time interval wherein a shutter being tested is open.

3. A method of ascertaining the actual operating speed of the shutter of a camera, which comprises the steps of rotating a cylindrical background member having thereon a spiral surface indicator stripe at a predetermined r.p.m. alongside a fixed linear scale parallel to the cylinder, exposing a film in the camera in a manner to photograph the apparent movement of the indicator stripe as a blur in a picture developed from the film by operating the shutter being tested, and using the following equation to find the speed at which the shutter operated:

$$\frac{1}{(L \times R) \div (D - W)} = S$$

where L is the linear length of the cylinder; R is the r.p.s. of the cylinder; D is the linear length of the stripe blur; W is the width of the stripe; and S is the shutter speed in fractions of a second.

References Cited

UNITED STATES PATENTS

| 351,108 | 10/1886 | Higgins. | |
| 2,942,929 | 6/1960 | Ziegler | 73—5 |

OTHER REFERENCES

Photo Technique, August 1940, pp. 70, 71, 72.

S. CLEMENT SWISHER, *Primary Examiner.*